June 8, 1937.  A. DE M. RIGGS  2,082,905

VEHICLE DIRECTION INDICATOR

Filed Sept. 21, 1936   2 Sheets-Sheet 1

Inventor:
A. de M. Riggs,
Seymour Bright &
Nottingham
Attorney.

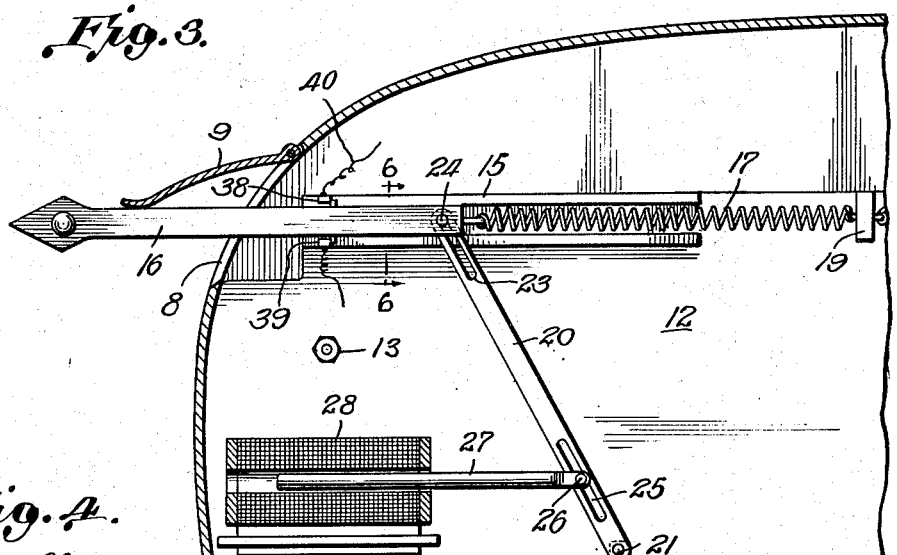
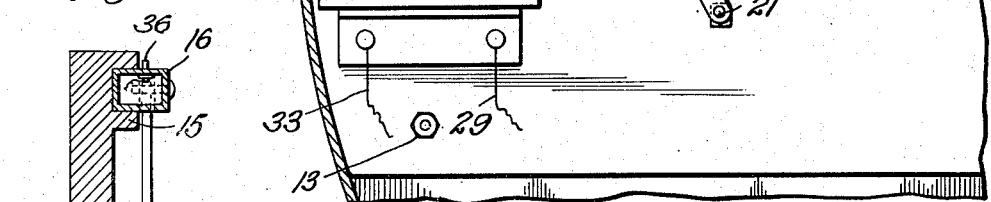
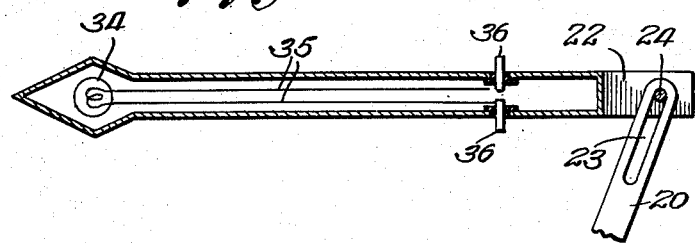
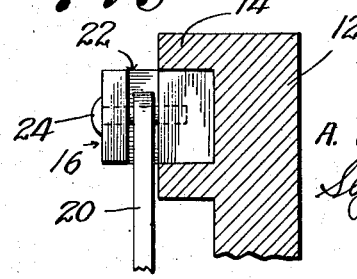

Patented June 8, 1937

2,082,905

UNITED STATES PATENT OFFICE 2,082,905

VEHICLE DIRECTION INDICATOR

Amalia de Murguiondo Riggs, Cooksville, Md.

Application September 21, 1936, Serial No. 101,882

1 Claim. (Cl. 177—329)

REISSUED

This invention relates to direction indicators and more particularly to means for indicating the direction intended to be taken by the driver of a motor vehicle in steering the latter.

The primary object of the invention is to provide a direction indicator of simple, inexpensive and durable construction and one which will not be liable to get out of order.

Another object is to furnish indicating mechanism forming a structure which may be inserted into an automobile and set up without material alteration of the motor vehicle.

With the foregoing objects outlined and with other objects in view which will appear as the description proceeds, the invention consists in the novel features hereinafter described in detail, illustrated in the accompanying drawings, and more particularly pointed out in the appended claim.

In the drawings:

Fig. 3 is an enlarged view of a portion of the mechanism shown in Fig. 2 and with one of the arrows in projected position.

Fig. 4 is a longitudinal vertical sectional view of a detail taken on the line 4—4 of Fig. 2.

Fig. 5 is a vertical sectional view of a detail of one of the arrows.

Fig. 6 is a sectional view of a detail taken on the line 6—6 of Fig. 3.

Figure 1:
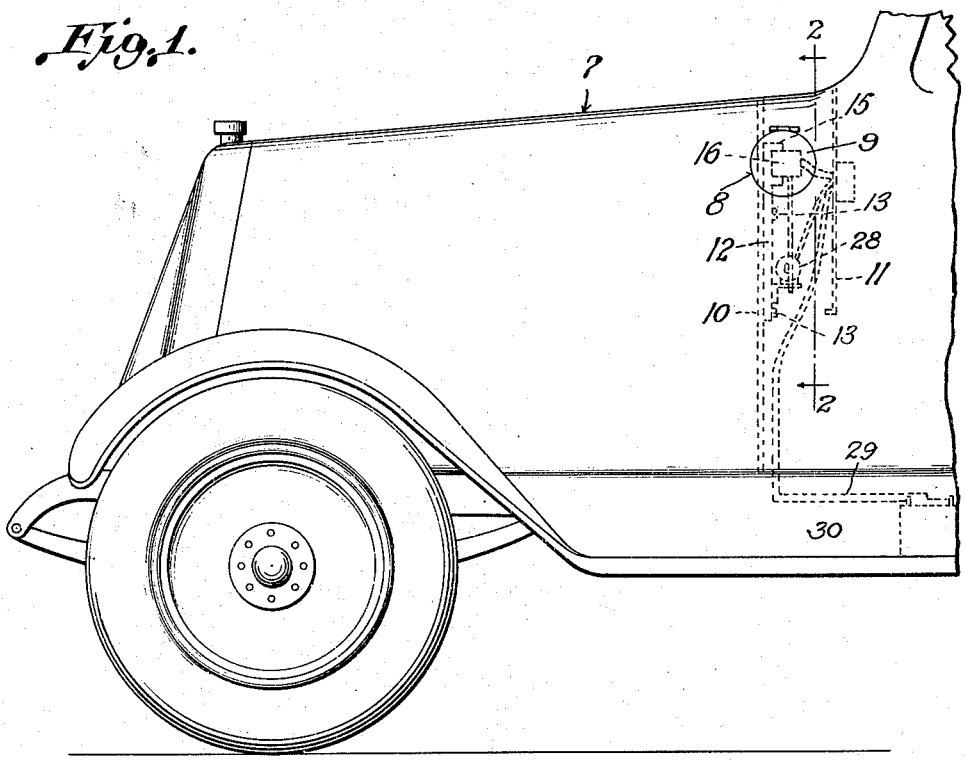
Fig. 1 is a side elevation of the front portion of an automobile equipped with my improved construction.

Referring to the drawings, 7 designates a motor vehicle of conventional construction which, for the purposes of the present invention, will be provided at opposite sides of the cowl with ports 8 closed by hinged doors 9.

Within the cowl between the partition 10 and the instrument board 11 I arrange a mounting board 12 which may be secured to the partition 10 by any preferred means such as bolts 13, and may be made of any suitable material such as wood, aluminum or the like.

Right and left tracks or guiding means 14 and 15 are secured to the board 12 to guide hollow arrows or pointers 16 adapted to be normally housed within the automobile, but arranged to be projected through the ports 8 for indicating purposes. These arrows are normally held in retracted position by any suitable means, such as coil springs 17, each having its outer end connected to an arrow as shown at 18 and its other end secured at 19 to a bracket on the board 12.

Swinging levers 20 have their lower ends pivotally mounted on the board 12 at the points 21 and the upper end of each lever extends into the forked-shaped end 22 of its complementary arrow. This end of the lever has an elongated slot 23 functioning as a guide for a pin 24 that spans the fork 22.

The medial portion of each lever is also slotted as shown at 25 to receive a pin 26 carried by the outer end of the movable member 27 of an electromagnet or solenoid 28. When the electromagnet is energized, the member 27 moves into the same and this causes the lever 20 to swing and the arrow to be moved into projected position, and during such movement the pins 24 and 26 slide along the slots of the lever.

The solenoids are connected by electricity-conducting wires 29 to the battery 30 of the vehicle and the battery is connected by wires 31 to manually operated switches 32 which in turn are connected by wires 33 to the electromagnet. Obviously when the right-hand switch is closed, the right-hand electromagnet will be energized and the corresponding arrow will be moved outwardly through the right-hand port 8 for signalling purposes, and when said switch is open, the right-hand spring 17 will move the arrow to retracted position. In the same manner, the left-hand arrow is projected when the left switch is closed.

Figure 2:
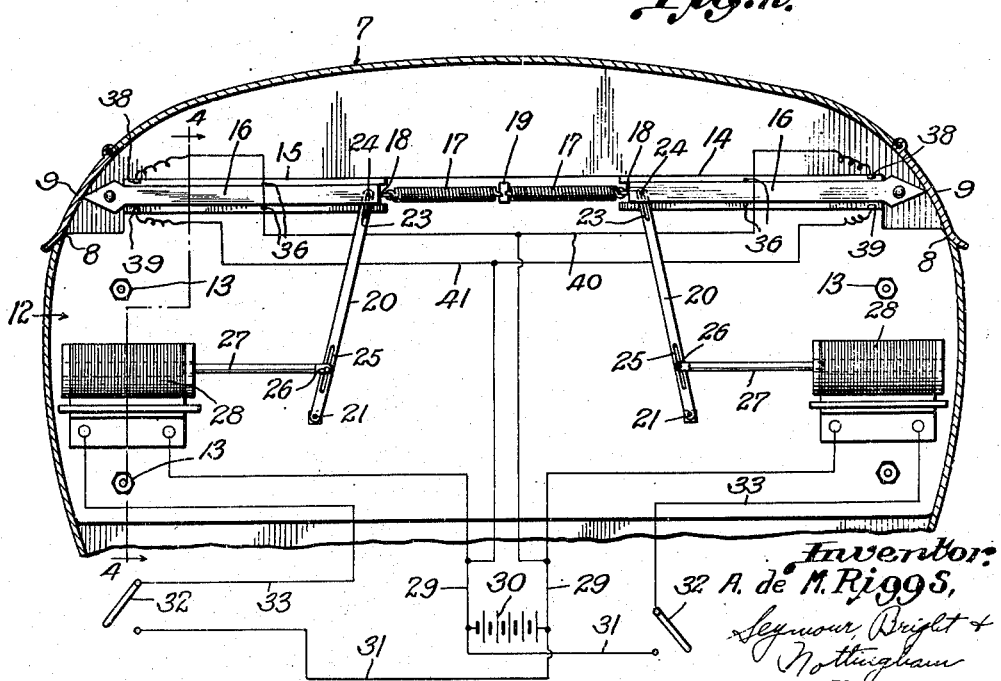
Fig. 2 is a transverse vertical sectional view taken on line 2—2 of Fig. 1, and showing the arrows or pointers in retracted position.

In order to illuminate the arrows, each one is provided internally with an electric light bulb 34 connected by wires 35 to opposite contacts 36 which, when the arrow is moved to projected position, come into engagement with stationary contacts 38 and 39. As shown in Fig. 2, the contact 38 is connected by a conducting wire 40 to the right-hand wire 29 and the contact 39 is connected by a wire 41 to the left-hand wire 29. Therefore, when either switch is closed, the corresponding lamp will be illuminated as soon as the arrow containing that particular lamp reaches projected position.

From the foregoing it is believed that the construction, operation and advantages of the invention may be readily understood by those skilled in the art and it is evident that changes may be made in the details disclosed without departing from the spirit of the invention as expressed in the claim.

What I claim and desire to secure by Letters Patent is:

A vehicle direction indicating means, comprising a port in the side of a vehicle, stationary guiding means arranged in the vehicle adjacent to and in line with said port, a horizontally movable indicating member guided by the guiding means and adapted to be projected through said port, a spring connected to the indicating member for normally holding the latter in retracted position, a solenoid positioned substantially parallel to the guiding means and arranged within the vehicle, said solenoid having a movable member, a pivot pin fixedly positioned in the vehicle adjacent the solenoid and below the plane of the movable member, a lever having one of its ends pivotally mounted on said pin, the medial portion of the lever being provided with a longitudinal slot, a pin passing through the last-mentioned slot and secured to the movable member of the solenoid, the opposite end of the lever being also slotted, and a pin fixedly secured to the indicating member and passing through the last-mentioned slot of the lever.

AMALIA DE MURGUIONDO RIGGS.